(12) United States Patent
Gossens et al.

(10) Patent No.: US 10,486,857 B2
(45) Date of Patent: Nov. 26, 2019

(54) STACKABLE COOKWARE AND LIDS

(71) Applicant: CALPHALON CORPORATION, Atlanta, GA (US)

(72) Inventors: Caleb Gossens, Portage, MI (US); Dean Olaya, Atlanta, GA (US); Steve Muske, Marietta, GA (US)

(73) Assignee: CALPHALON CORPORATION, Atlanta, GA (US)

( * ) Notice: Subject to any disclaimer, the term of this patent is extended or adjusted under 35 U.S.C. 154(b) by 126 days.

(21) Appl. No.: 15/441,344

(22) Filed: Feb. 24, 2017

(65) Prior Publication Data

US 2017/0247143 A1 Aug. 31, 2017

Related U.S. Application Data

(60) Provisional application No. 62/299,760, filed on Feb. 25, 2016.

(51) Int. Cl.
*A47J 27/12* (2006.01)
*B65D 21/02* (2006.01)
(Continued)

(52) U.S. Cl.
CPC ........ B65D 21/0233 (2013.01); *A47J 27/002* (2013.01); *A47J 27/12* (2013.01);
(Continued)

(58) Field of Classification Search
CPC .... B65D 21/0233; B65D 25/28; A47J 27/002; A47J 27/12; A47J 36/06; A47J 45/06
(Continued)

(56) References Cited

U.S. PATENT DOCUMENTS 3,641,920 A * 2/1972 Kraft ................. A47J 27/08
219/440
2008/0179211 A1* 7/2008 Kutsch ................. A47J 45/07
206/514
(Continued)

FOREIGN PATENT DOCUMENTS

| CA | 1 255 240 A | | 6/1989 | |
|----|---|---|---|---|
| CN | 203662547 | * | 6/2014 | ............. A47J 27/12 |
| WO | 2006/100367 A1 | | 9/2006 | |

OTHER PUBLICATIONS

Extended Search Report issued in European Application No. 17 15 7988, dated Jun. 23, 2017, 8 pages.

*Primary Examiner* — Andrew T Kirsch
*Assistant Examiner* — Elizabeth J Volz
(74) *Attorney, Agent, or Firm* — Eversheds Sutherland (US) LLP

(57) ABSTRACT

Systems and methods are disclosed for stackable cookware and lids. An example stackable cookware system may include a first vessel having a first upper diameter, the first vessel comprising a first handle with a first length, a first lid having the first upper diameter, the first lid comprising a second handle with a second length and a first inner rim positioned inside the first vessel, and a second vessel having the first upper diameter, a third handle, and a first gripping portion, wherein the first gripping portion has a lower surface aligned with a lower portion of the third handle, wherein the first vessel, the first lid, and the second vessel are stackable in a stack with an interchangeable arrangement.

20 Claims, 12 Drawing Sheets

(51) Int. Cl.
*A47J 27/00* (2006.01)
*A47J 36/06* (2006.01)
*A47J 45/06* (2006.01)
*B65D 25/28* (2006.01)

(52) U.S. Cl.
CPC .............. *A47J 36/06* (2013.01); *A47J 45/06* (2013.01); *B65D 25/28* (2013.01)

(58) Field of Classification Search
USPC ............ 220/23.83, 573.1, 573.4, 573.5, 912; 206/514, 499, 821
See application file for complete search history.

(56) References Cited

U.S. PATENT DOCUMENTS

| | | | |
|---|---|---|---|
| 2009/0049650 A1 | 2/2009 | Cuillery et al. | |
| 2010/0230319 A1* | 9/2010 | Thomson .............. | A47J 27/122 206/514 |
| 2013/0098920 A1* | 4/2013 | Lee ......................... | A47J 27/12 220/573.1 |
| 2014/0238997 A1* | 8/2014 | Sarnoff ................... | A47J 27/00 220/573.1 |

* cited by examiner

US 10,486,857 B2

STACKABLE COOKWARE AND LIDS

CROSS-REFERENCE TO RELATED APPLICATIONS

This application claims the benefit of U.S. Provisional Application No. 62/299,760 filed Feb. 25, 2016, which is hereby incorporated by reference in its entirety.

BACKGROUND

Cookware, such as pots and pans, may have lids. Storing cookware and lids may consume space, for example, when stored. In some instances, cookware may be stacked such that a larger cookware vessel is at a bottom of a stack with a smaller cookware vessel placed inside the larger cookware vessel, with the lids of the cookware vessels placed on top of the stack. As a result, storage and organization of cookware may consume space and may be difficult to store in certain locations, such as kitchen cabinets.

SUMMARY

According to an embodiment of the disclosure, a stackable cookware system may include a first vessel having a first upper diameter, the first vessel having a first handle extending from a sidewall of the first vessel, wherein the first handle has a first length. The stackable cookware system may include a first lid having the first upper diameter, the first lid having a second handle with a second length and a first inner rim extending from a surface of the first lid, the first inner rim having a first inner rim diameter that is less than the first upper diameter, wherein the first inner rim is configured to be positioned inside the first vessel, and a second vessel having the first upper diameter, a third handle, and a first gripping portion, wherein the first gripping portion has a lower surface aligned with a lower portion of the third handle. The first vessel, the first lid, and the second vessel may be stackable in a stack with an interchangeable arrangement.

According to an embodiment of the disclosure, a cookware system may include a pot with an upper diameter, a frying pan with the upper diameter positioned on an upper portion of the pot, the frying pan having a first handle and a gripping portion configured to engage an upper surface of the pot, wherein a sidewall of the frying pan is tapered such that a portion of the frying pan fits inside the pot, and a lid with the upper diameter positioned on an upper portion of the frying pan, the lid having a second handle positioned on an upper portion of the first handle and an inner rim positioned inside the frying pan.

According to an embodiment of the disclosure, a cookware system may include a pot with an upper diameter and a first handle, a first lid with the upper diameter positioned on an upper portion of the pot, the first lid having a second handle positioned on an upper portion of the first handle and a first inner rim positioned inside the pot, and a second lid with the upper diameter positioned on an upper portion of the first, the second lid having a third handle positioned on an upper portion of the second handle and a second inner rim in contact with the first lid.

Other features and aspects of the stackable cookware and lids, and manufacturing processes thereof, will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
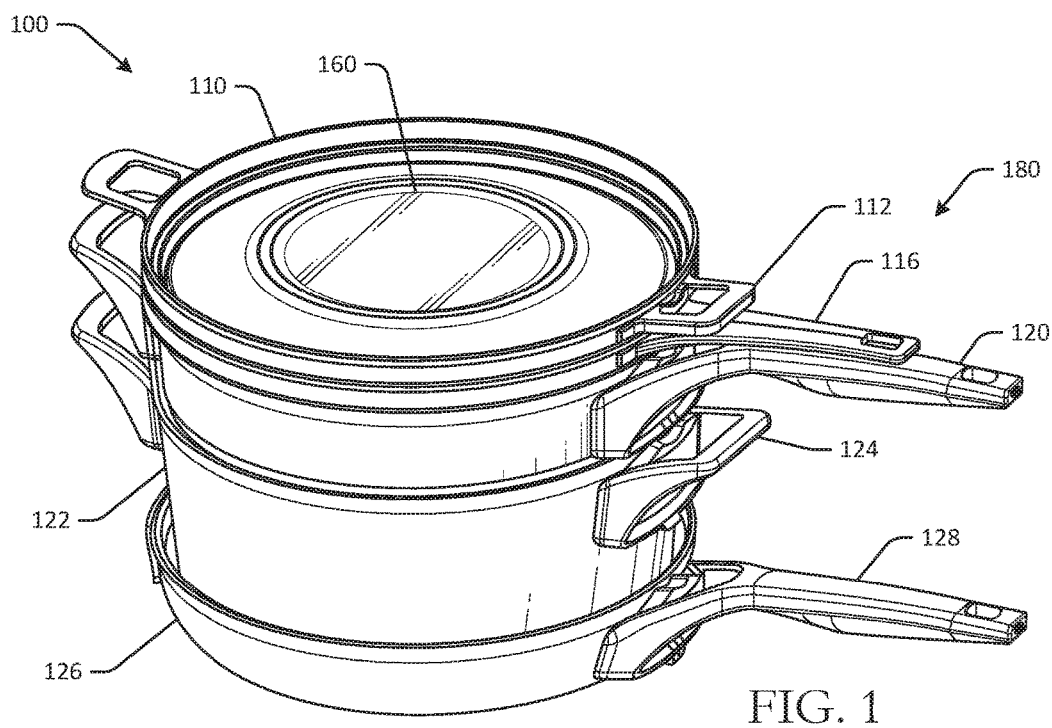
FIGS. 1-4 schematically depict various views of a stackable cookware system in accordance with one or more embodiments of the disclosure.
Figure 2:
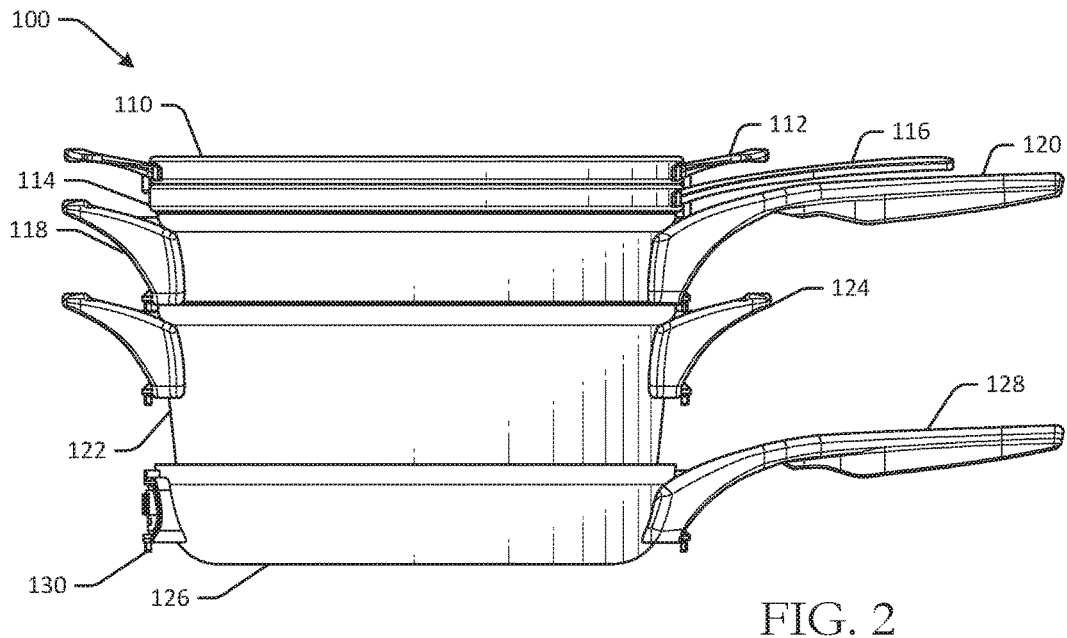

Embodiments of this disclosure relate to stackable cookware systems with cookware vessels and lids that may be stacked in any order. For example, a frying pan, a pot, and the respective lids may be stacked such that one or both of the lids form a bottom of the stack, or such that the lids are positioned in between the frying pan and the pot, or in any other order or stack arrangement. Embodiments of the disclosure may include cookware vessels with consistent upper diameters and with tapered sidewalls, so as to allow at least a portion of a cookware vessel to be positioned within another cookware vessel when stacked. For example, a pot may have a draft or taper angle of equal to or greater than about 5 degrees and equal to or less than about 15 degrees, such as an approximate 6 degree or an approximate 8 degree taper or draft from an upper diameter to a lower diameter so as to allow the pot to fit within another pot or frying pan. In addition, embodiments of the disclosure may include badges or gripping portions that allow for stable positioning of cookware vessels. For example, a frying pan may have a badge or gripping portion substantially opposite a handle, where the badge or gripping portion includes a ledge that engages a top of a cookware vessel the frying pan is positioned on top of. Embodiments of the disclosure may have upper diameters of any size, such as about 7.5", 8.25", 10", 12", or any other size. Embodiments of the disclosure may include lids for the cookware vessels. The lids may be substantially flat or planar, or may be domed, and may be formed from glass, steel, a composite material, or another material. The lids may include handles. In some embodiments, the lid handles may be configured to engage cookware vessel handles. In such embodiments, the lid handles may be of a different length than the cookware vessel handles. In other embodiments, the lid handles may be positioned along a perimeter of the lid, on top or bottom of a lid ("top", "bottom", "upper", and "lower" are used to describe example embodiments and not to refer to absolute positions), and may have C-shape configurations. In some embodiments, lid handles may be rotatable with respect to the lids, such that the lid handles may lay flat on a surface of a lid. The stackable cookware systems described herein may allow cookware vessels and lids to be stacked in any order, thereby allowing users to put their cookware on top of lids. In certain embodiments, a stack of vessels and lids can have a consistent spacing between adjacent stacked vessels as well as consistent spacing between adjacent stacked lids, wherein the adjacent stacked vessels are oriented in a nested and substantially parallel orientation with respect to each other, and likewise, wherein the adjacent stacked lids are oriented in a nested and substantially parallel orientation with respect to each other.

Referring to FIGS. 1-4, an example stackable cookware system 100 is depicted in accordance with one or more embodiments of the disclosure. The stackable cookware system 100 may include one or more vessels and/or one or more lids. In the illustrated example, the stackable cookware system 100 may include a first lid 110 with a first handle 112, a second lid 114 with a second handle 116, a first vessel 118 with a third handle 120, a second vessel 122 with a fourth handle 124, and a third vessel 126 with a fifth handle 128. Any of the lids or vessels may have one or more handles. For example, as shown, the first lid 110 may include two opposing loop handles. The respective lids and vessels may be stackable in any arrangement. For example, the first lid 110 may be stacked on top of the second lid 114, which may be stacked on top of the first vessel 118, the second vessel 122, and the third vessel 126. The third vessel 126 may be a frying pan, while the first vessel 118 and the second vessel 122 may be, for example, pots. Other vessels may be used.

The vessels 118, 122, 126 may be any cookware vessels. For example, the first vessel 118 may be, for example, a frying pan, the second vessel 122 may be a pot pan, and the third vessel 126 may be a sauté pan. Any of the vessels may include a pouring feature configured to allow fluid to be poured out of or into the vessel.

The lids 110, 114 may be flat, substantially planar, domed, or in another configuration. For example, the first lid 110 may have a substantially flat cover portion 160. The lids 110, 114 may universal in that the lids 110, 114 may be positioned on top of any one of the vessels 118, 122, 126, or may be specific to specific vessels.

One or more of the lid handles 112, 116 and one or more of the vessel handles 120, 124, 128 may be looped or elongated members configured to allow a user to grip the respective handle. In such embodiments, the handles may be positioned so as to stack on top of each other in a stacked handle configuration 180, as shown in FIGS. 1-4. The lid handles 112, 116 may be attached to the respective cover portions of the lids with one or more rivets. In some embodiments, the rivets may be recessed.

The lid handles 112, 116 and the vessel handles 120, 124, 128 may have the same or different lengths. For example, the second lid 114 may be positioned on top of the first vessel 118. The second handle 116 on second lid 114 may have a length that is less than or greater than that of the third handle 120 on the first vessel 118. As a result, a user may be able to determine which handle belongs to the second lid 114 or the first vessel 118 based on the length.

The lid handles 112, 116 and the vessel handles 120, 124, 128 may have the same or different curvatures. In embodiments where the curvature is the same or substantially the same, the lid handles may rest on top of the vessel handles and may provide resistance or friction to sliding off of the vessel handles. The lid handles 112, 116 and the vessel handles 120, 124, 128 may be riveted on the respective lids or vessels, or may be formed in or welded on the respective lids or vessels.

The first vessel 118 may have a first upper diameter. The third handle 120 may extend from a sidewall of the first vessel 118, and the third handle 120 may have a first length. The second lid 114 may have the same first upper diameter as the first vessel 118. The third handle 120 of the first lid 110 may have a second length and a first inner rim extending from a surface of the first lid 110. The first inner rim may have a first inner rim diameter that is less than the first upper diameter. The first inner rim may be configured to be positioned inside the first vessel 118. In some embodiments, vessels may have gripping portions. For example, the third vessel 126 may have a gripping portion 130, where the gripping portion 130 has a lower surface that can be aligned with an adjacent gripping portion or handle of an adjacent vessel or lid. The lids 110, 114 and vessels 118, 122, 126 of the system may be stackable in a stack with an interchangeable arrangement.

Each of the vessels 118, 122, 126 and the lids 110, 114 may have the same upper diameter, thereby allowing the stackable cookware system 100 to be stacked in any order. For example, the vessels 118, 122, 126 may each have a diameter of about 12", thereby allowing the vessels to be stacked on top of each other in any order, as each vessel may be positioned on top of the other vessels.

Certain vessels may include badges or gripping portions to stabilize the vessel when stacked. For example, some frying pans may not have opposing handles, and may instead only have a single elongated handle. Embodiments of the disclosure may include badges or gripping portions opposite the elongated handle to stabilize the frying pan and to prevent the frying pan from tilting when the frying pan is stacked. For example, in FIG. 3, the third vessel 126 includes the gripping portion 130.

Figure 3:
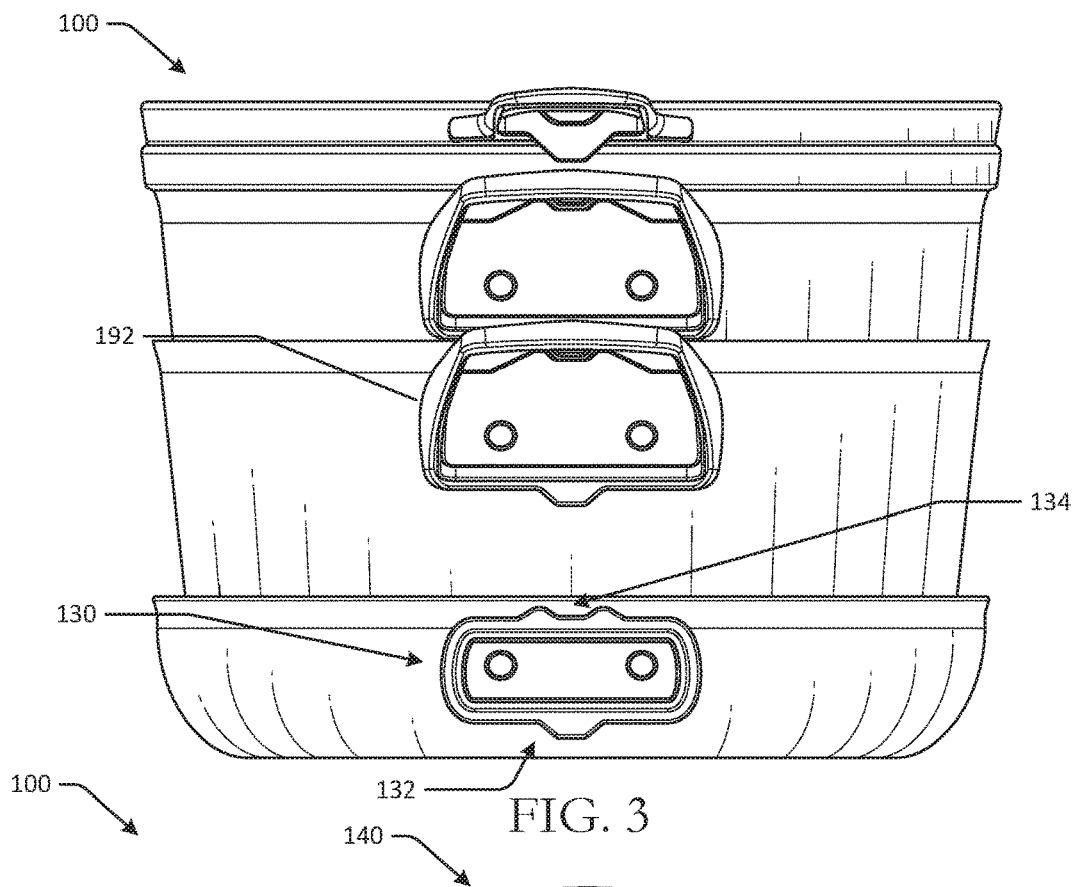
Figure 4:
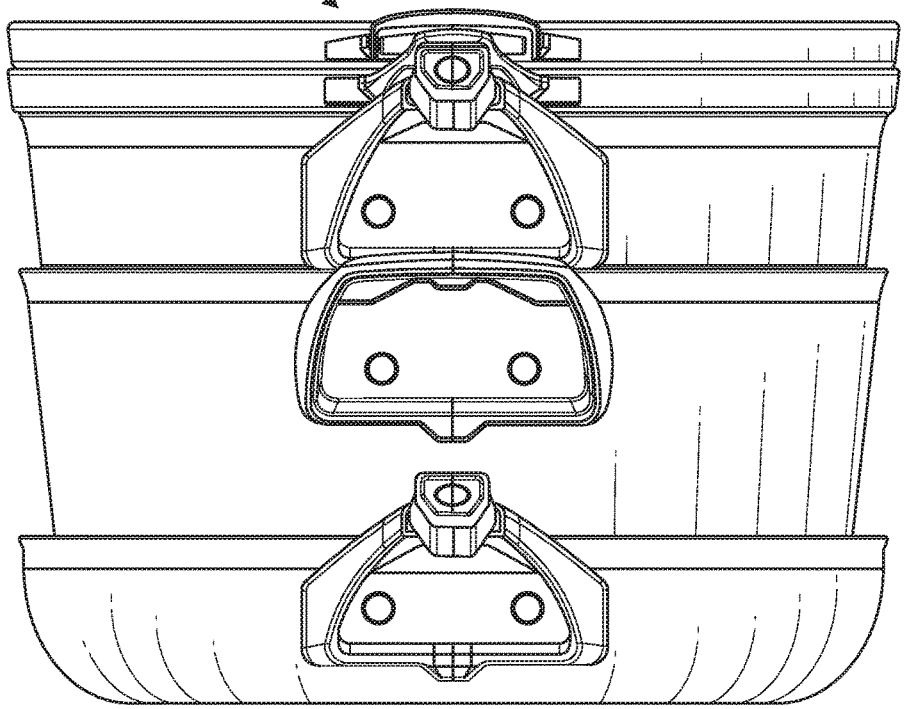

The handles of the respective vessels 118, 122, 126 and the lids 110, 114 may include one or more alignment features. For example, as illustrated in FIGS. 3-4, the handles may include a male alignment feature and a female alignment feature. Some handles or vessels/lids may include one or both the male and female alignment features. The alignment features may be used to align the handles or other portions of vessels or lids when stacking.

As shown in FIG. 3, the gripping portion 130 of the third vessel 126 may include a first male alignment feature 132 which may be a protrusion, and a first female alignment feature 134 which may be a detent or another opening configured to receive a male alignment feature. The male alignment feature may be positioned on a lower portion of a handle or rest, while the female alignment feature may be positioned on an upper portion of a handle or rest. Other embodiments may use a reverse or different arrangement. As shown in FIG. 4, the handles may include the male and female alignment features 140 that can be used to align the vessels and lids in any stacked arrangement.

In some embodiments, the male alignment feature may be a tab and the female alignment feature may be a recess. When an upper vessel or lid is sitting on the rim of a lower vessel or lid, the tab or male alignment feature may extend beyond and/or below the rim on the lower vessel or lid, and may rest in the female alignment feature or recess on the lower vessel or lid. When an upper vessel is sitting on a lower vessel, the upper vessel can be rotated on top of the lower vessel, and the tab and recess (e.g., male and female alignment feature, etc.) may slide past each other so that a user doesn't have to align the tab and recess prior to stacking the vessels. The sliding and/or rotation may allow for easier stacking, and the alignment features may provide a physical feature to align the vessels. In some instances, such as if an upper vessel rests inside a lower vessel, the alignment tabs and recesses may not interface. Some embodiments may include alignment features on lid handles (long and loop) when a lid is set on a vessel or another lid the tab and recess will interface for alignment. Some embodiments may not include alignment features.

As shown in FIGS. 1-4, the stack of vessels and lids can have a consistent spacing between the adjacent stacked vessels, wherein the adjacent stacked vessels are oriented in a nested and substantially parallel orientation with respect to each other.

These and other embodiments of the disclosure will be described in more detail through reference to the accompanying drawings in the detailed description of the disclosure that follows. This overview, including section titles and corresponding summaries, is provided for convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 5:
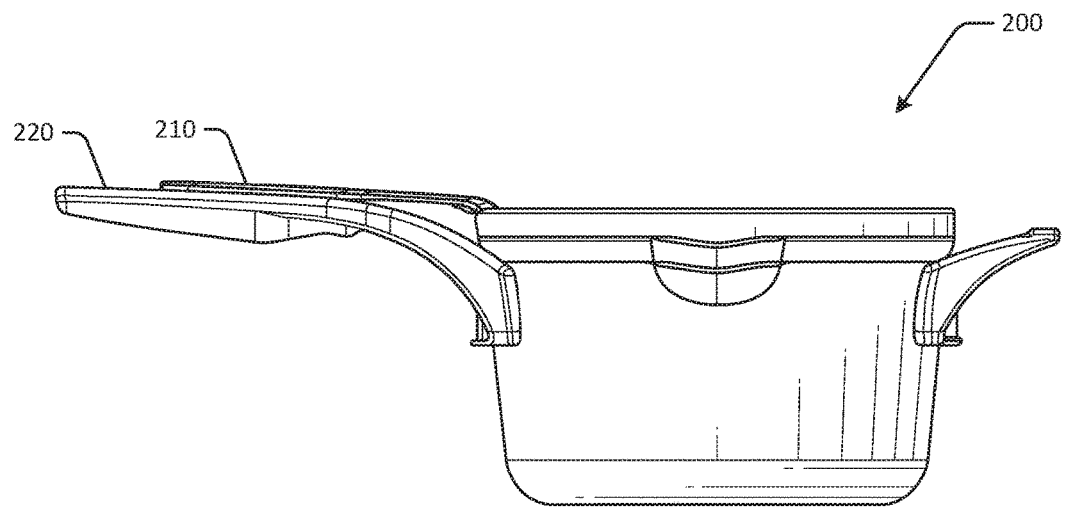
FIGS. 5-6 schematically depict a stackable pot and lid in accordance with one or more embodiments of the disclosure.
Figure 6:
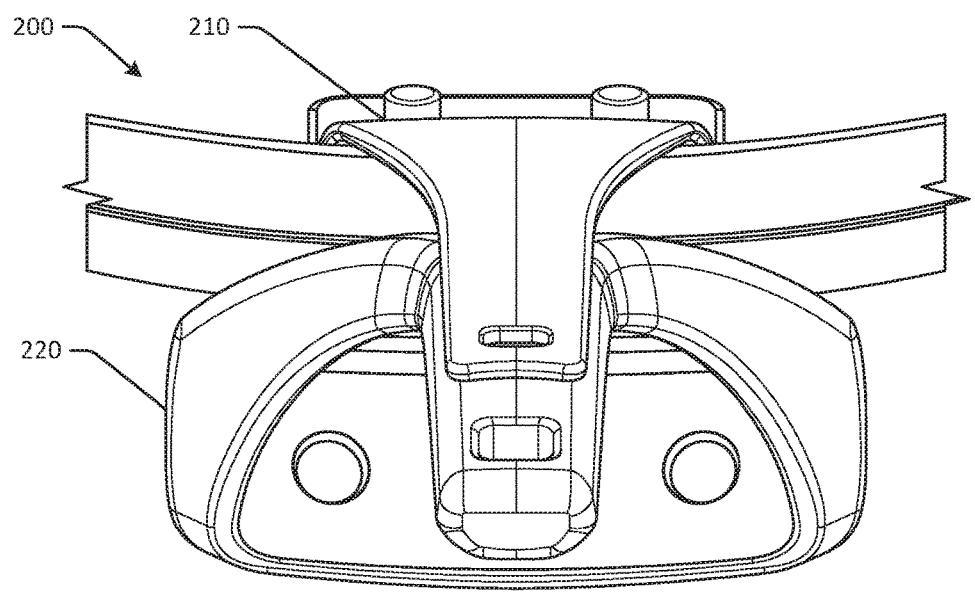

Referring to FIGS. 5-6, a stackable pot and lid system 200 in accordance with one or more embodiments of the disclosure is depicted. The stackable pot and lid system 200 may include a pot and a lid. The lid may have a first elongated handle 210, and the pot may have a second elongated handle 220. The first elongated handle 210 may be shorter than the second elongated handle 220. The first elongated handle 210 may have a curvature that corresponds to a curvature of the second elongated handle 220. The first elongated handle 210 and the second elongated handle 220 may have one or more alignment features. The first elongated handle 210 may therefore be positioned on top of the second elongated handle 220. In other embodiments, the curvature of the first and second elongated handles 210, 220 may be convex, concave, or flat. The first and second handles 210, 220 may have the same or different widths or thicknesses.

Figure 7:
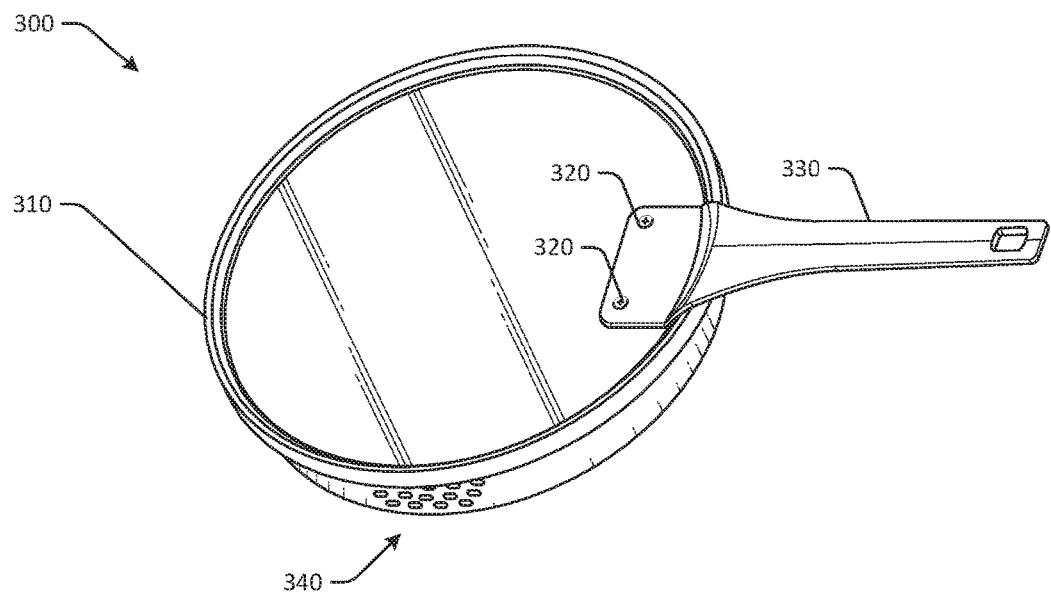
FIGS. 7-8 schematically depict a stackable lid with a straining portion in accordance with one or more embodiments of the disclosure.
Figure 8:
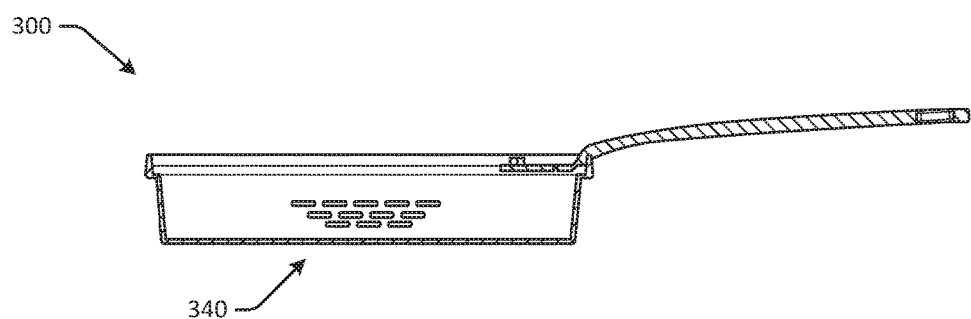

Referring to FIGS. 7-8, a stackable lid 300 with a straining portion in accordance with one or more embodiments of the disclosure is depicted. The stackable lid 300 may include a cover portion 310, a handle 330 connected to the cover portion by one or more rivets 320, and a straining feature 340. The straining feature 340 may be positioned about an inner rim extending from the stackable lid 300. The straining feature 340 may include one or more apertures formed in the inner rim of the stackable lid 300. The inner rim may have a height that corresponds (e.g., is equal to or greater than, etc.) a height of a pouring feature on a vessel (e.g., pouring feature 150 in FIG. 1, etc.). The inner rim (or wall forming the inner rim) of the stackable lid 300 may be tapered, as shown in the cross-sectional view of FIG. 6, so as to allow the inner rim to fit inside a cookware vessel. The taper may be equal to or greater than about 5 degrees and equal to or less than about 15 degrees, such as about 6 degrees or about 8 degrees in some embodiments.

Figure 9:
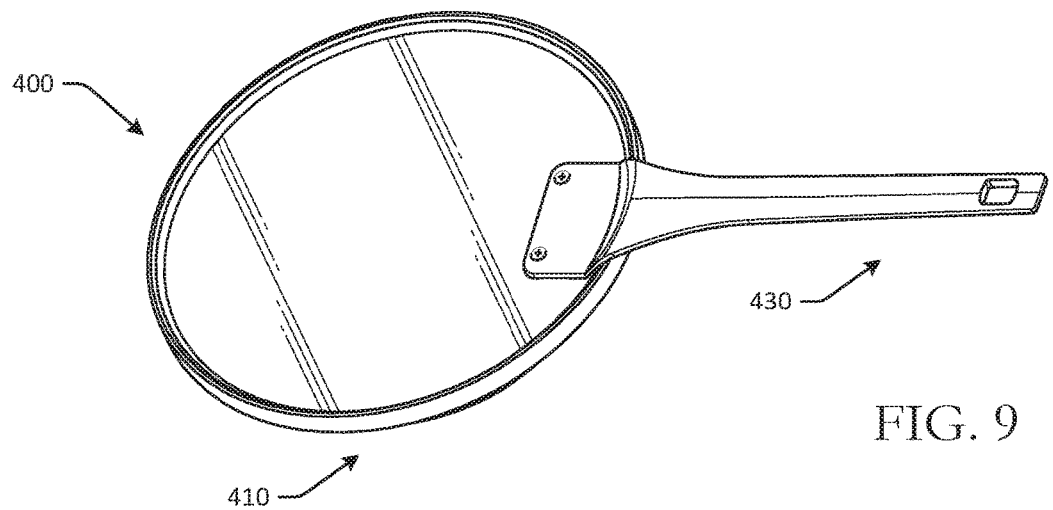
FIGS. 9-10 schematically depict a stackable lid in accordance with one or more embodiments of the disclosure.
Figure 10:
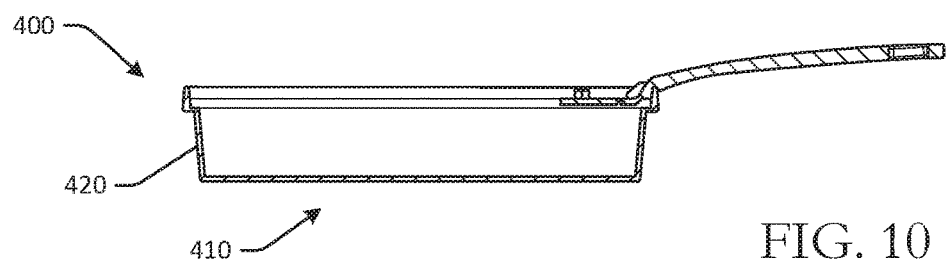

Referring to FIGS. 9-10, a stackable lid 400 in accordance with one or more embodiments of the disclosure is depicted. The stackable lid 400 may include an inner rim 410 and a handle 430. The inner rim 410 may extend from a perimeter portion of the stackable lid 400 and may be formed as a single piece. The inner rim 410 may be tapered 420 or otherwise angled.

Figure 11:
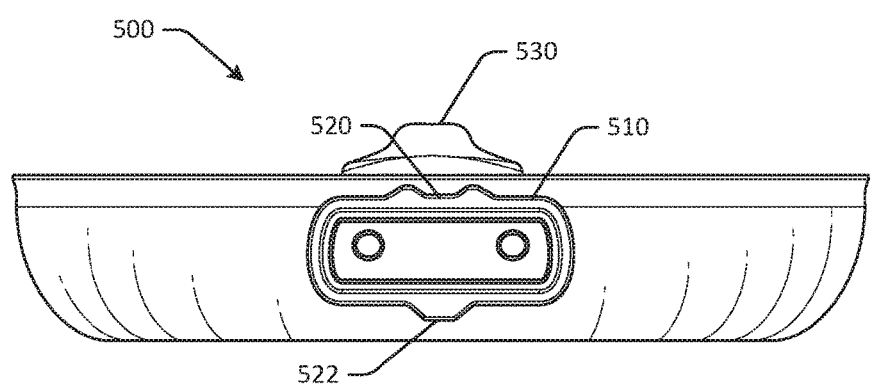
FIGS. 11-13 schematically depict a stackable frying pan with the stackable lid of FIGS. 9-10 in accordance with one or more embodiments of the disclosure.
Figure 12:
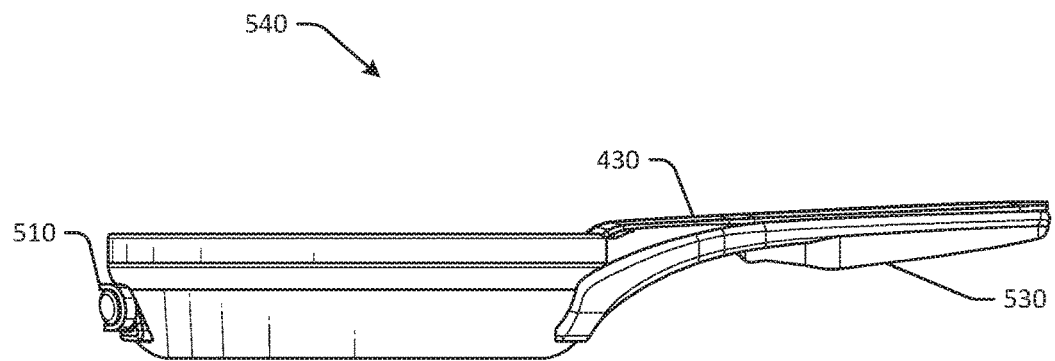
Figure 13:
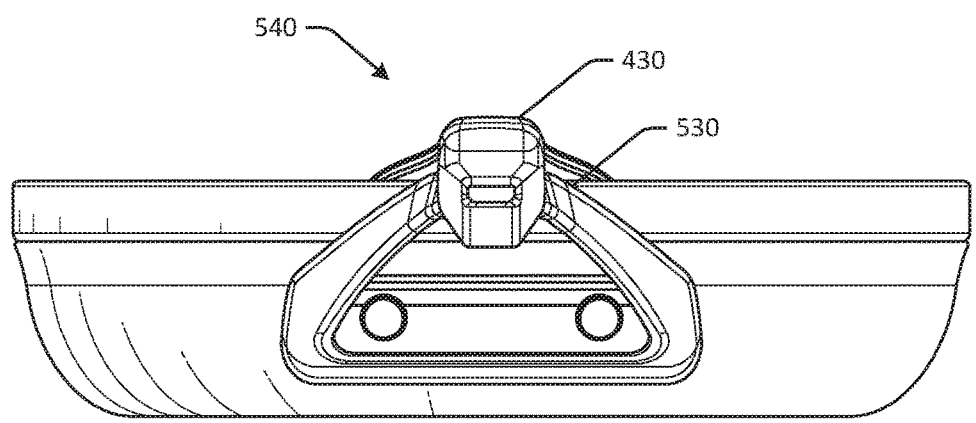
Figure 14:
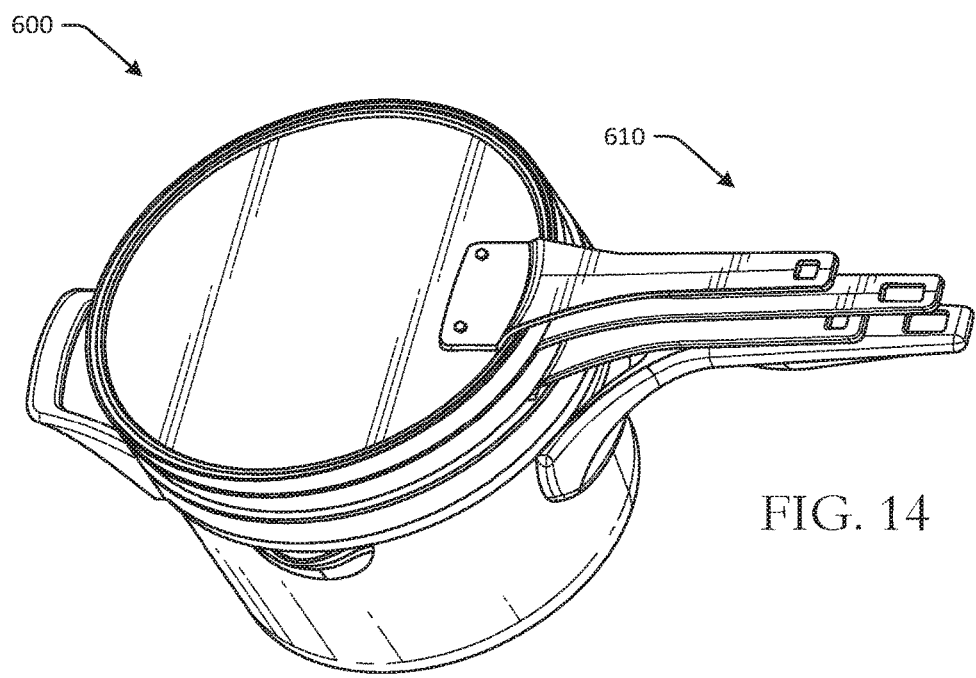
FIGS. 14-17 schematically depict another embodiment of a stackable cookware system in accordance with one or more embodiments of the disclosure.
Figure 15:
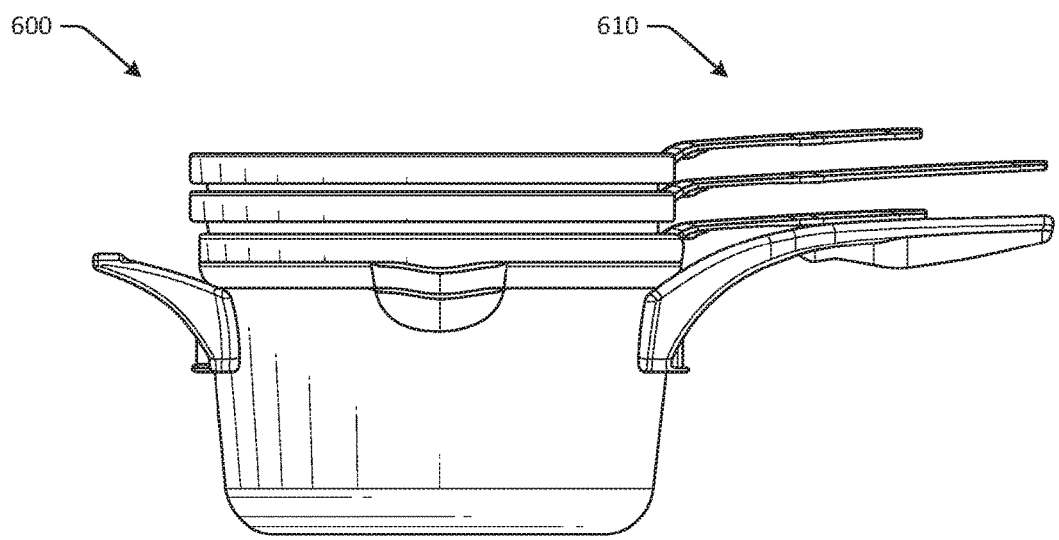
Figure 16:
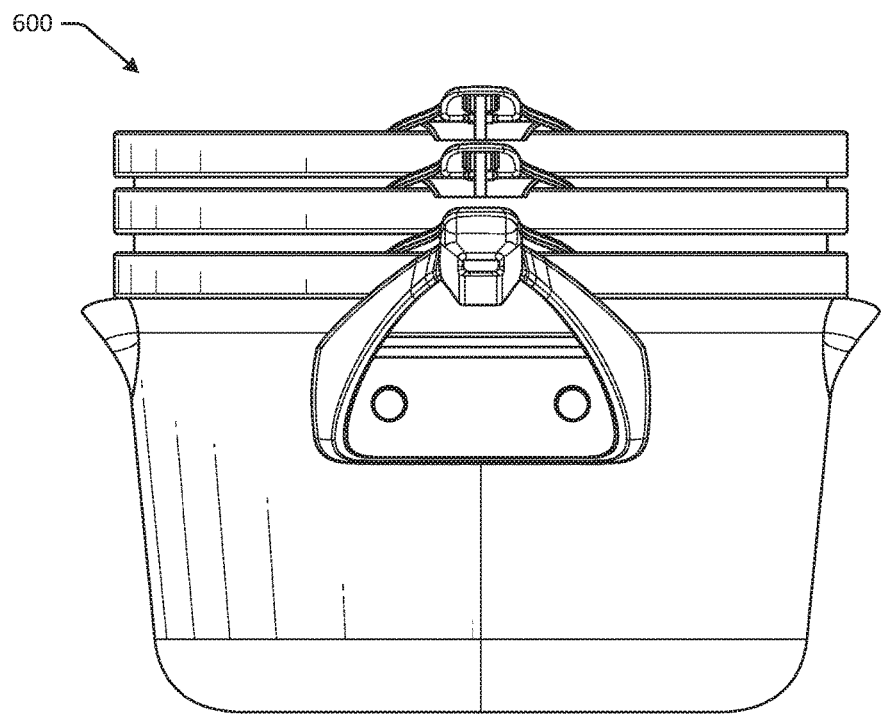
Figure 17:
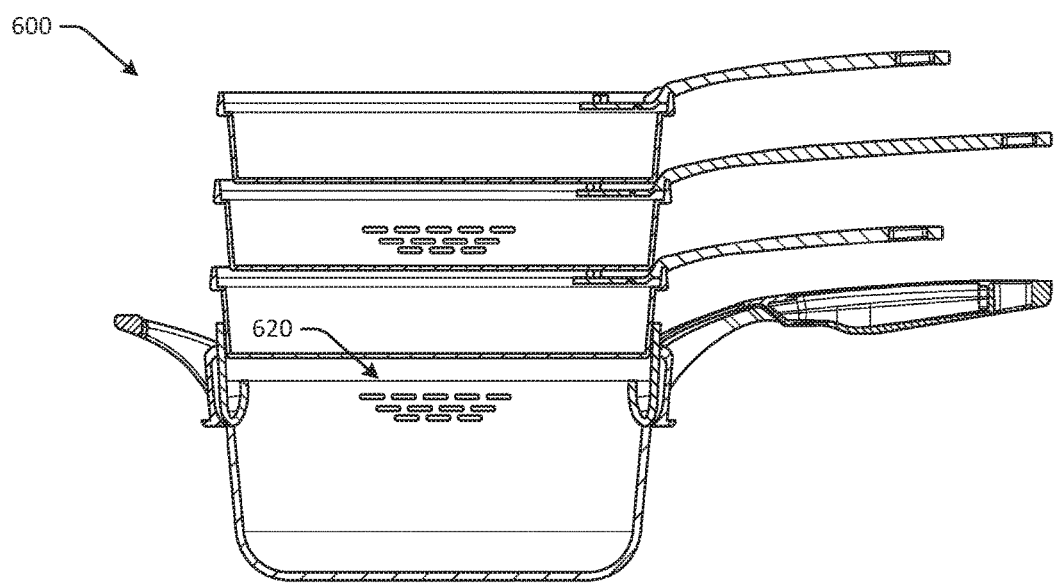

Referring to FIGS. 11-13, a stackable frying pan 500 with the stackable lid of FIGS. 9-10 is depicted in accordance with one or more embodiments of the disclosure. The stackable frying pan 500 may include a badge or gripping portion 510 with a female alignment feature 520 and a male alignment feature 522. The stackable frying pan 500 may include a handle 530. The male alignment feature 522 may be in contact with or may rest on an upper surface of a lid or vessel when the stackable frying pan 500 is positioned on top of a lid or vessel.

In FIGS. 12-13, the stackable frying pan 500 is positioned with the stackable lid 400 on top of the stackable frying pan 500. The lid handle 430 may be positioned on top of the frying pan handle 530 in a stacked arrangement 540. The inner rim 410 of the stackable lid 400 may be positioned, at least partially, inside the stackable frying pan 500. Because the outer diameters of both the stackable lid 400 and the stackable frying pan 500 are the same, the stackable frying pan 500 may be stacked on top of the stackable lid 400 in another arrangement.

Referring to FIGS. 14-17, a stackable cookware system 600 with a pot and three lids in accordance with one or more embodiments of the disclosure is depicted. The stackable cookware system 600 may include a pot positioned at a bottom of the stack and three lids positioned on top of the pot. The pot and the lids may have handles 610 of various lengths. The pot and lids may be stacked in any order. For example, one or more lids of the stackable cookware system 600 may be positioned under the pot. As shown in the cross-sectional view of FIG. 17, one or more of the lids may have pour and strain features 620 or other features positioned about an inner rim.

As shown in FIGS. 14-17, various stacks of vessels and lids can have a consistent spacing between adjacent stacked vessels as well as consistent spacing between adjacent stacked lids, wherein the adjacent stacked vessels are oriented in a nested and substantially parallel orientation with respect to each other, and likewise, wherein the adjacent stacked lids are oriented in a nested and substantially parallel orientation with respect to each other.

Figure 18:
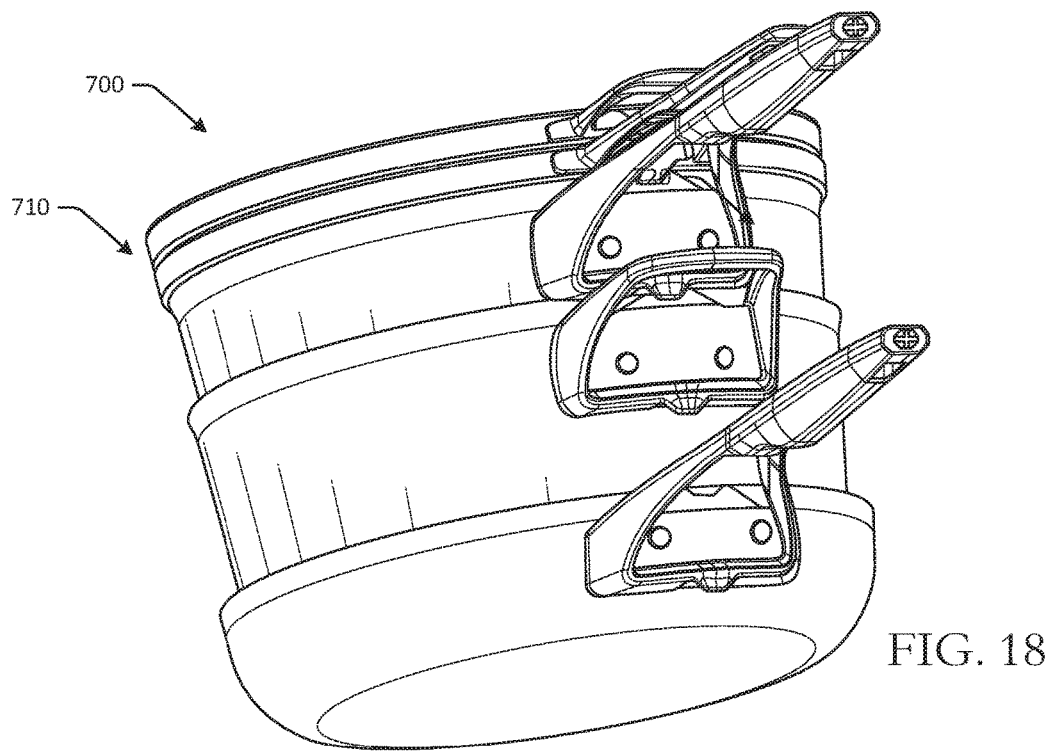
FIGS. 18-19 schematically depict another embodiment of a stackable cookware system in accordance with one or more embodiments of the disclosure.
Figure 19:
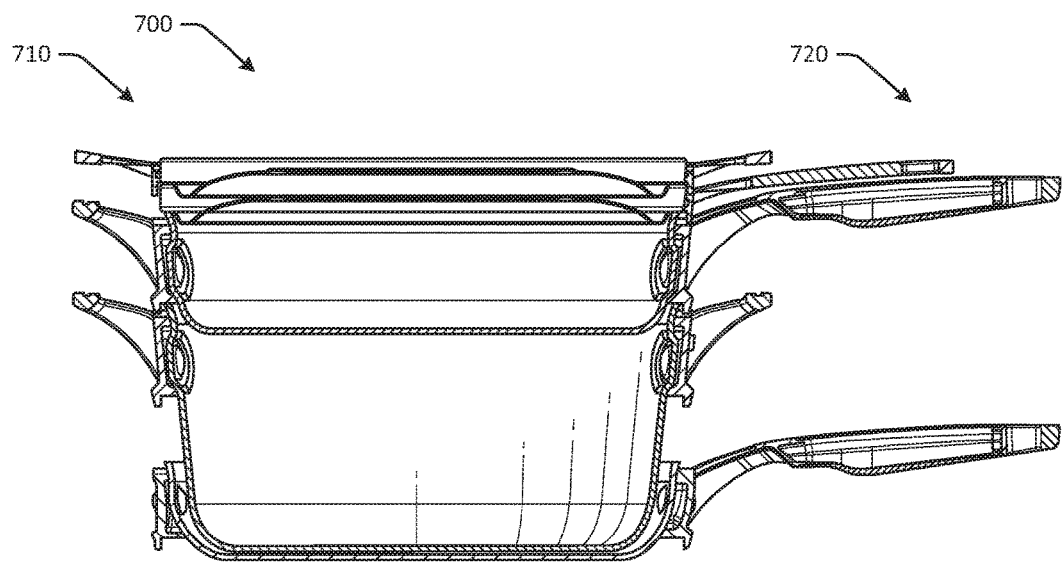

Referring to FIGS. 18-19, another embodiment of a stackable cookware system 700 in accordance with one or more embodiments of the disclosure is depicted. The stackable cookware system 700 may include one or more vessels and/or one or more lids. For example, the lids in the stackable cookware system 700 may include opposing handles 710 that are positioned opposite elongated handles 720 of the vessels. The opposing handles 710 may allow for the lids to be gripped or carried on both sides of the respective lids. In other embodiments, the lid handles may be loops or C-shaped and may be positioned about a perimeter or on a surface of the cover portion of the respective lid.

The stackable cookware systems described herein may allow cookware vessels and lids to be stacked in any order, thereby allowing users to put their cookware on top of lids.

As shown in FIGS. 18-19, a stack of vessels and lids can have a consistent spacing between adjacent stacked vessels as well as consistent spacing between adjacent stacked lids, wherein the adjacent stacked vessels are oriented in a nested and substantially parallel orientation with respect to each other, and likewise, wherein the adjacent stacked lids are oriented in a nested and substantially parallel orientation with respect to each other.

Figure 20:
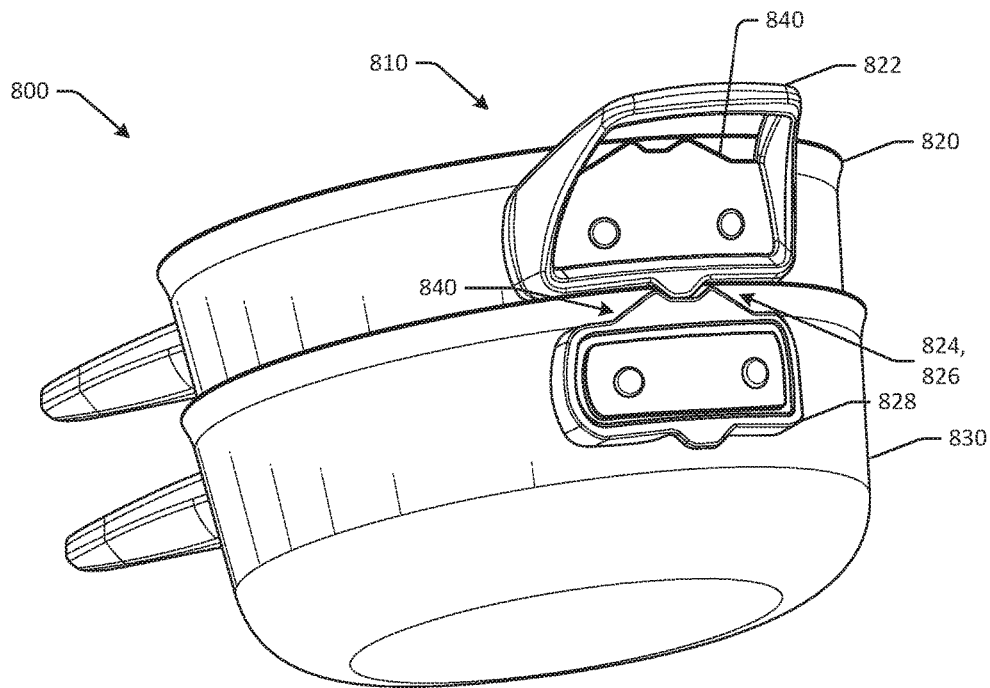
FIGS. 20-21 schematically depict additional embodiments of a stackable cookware system in accordance with one or more embodiments of the disclosure.

In FIG. 20, two stacked vessels 800 are illustrated with aligned alignment features 810. A first vessel 820 may have a loop handle 822 with a male alignment feature 824 that is aligned with a female alignment feature 826 of a rest portion 828 of a second vessel 830. The rest portion 828 and the loop handle 822 may be opposite long handles of the respective vessels.

As illustrated in FIG. 20, the handles and/or rest portions, such as rest portion 828 may include ramps 840 or other sliding features to allow an upper handle or rest portion to slide up and over, and into, the female alignment feature. Some embodiments may not include these alignment features.

Figure 21:
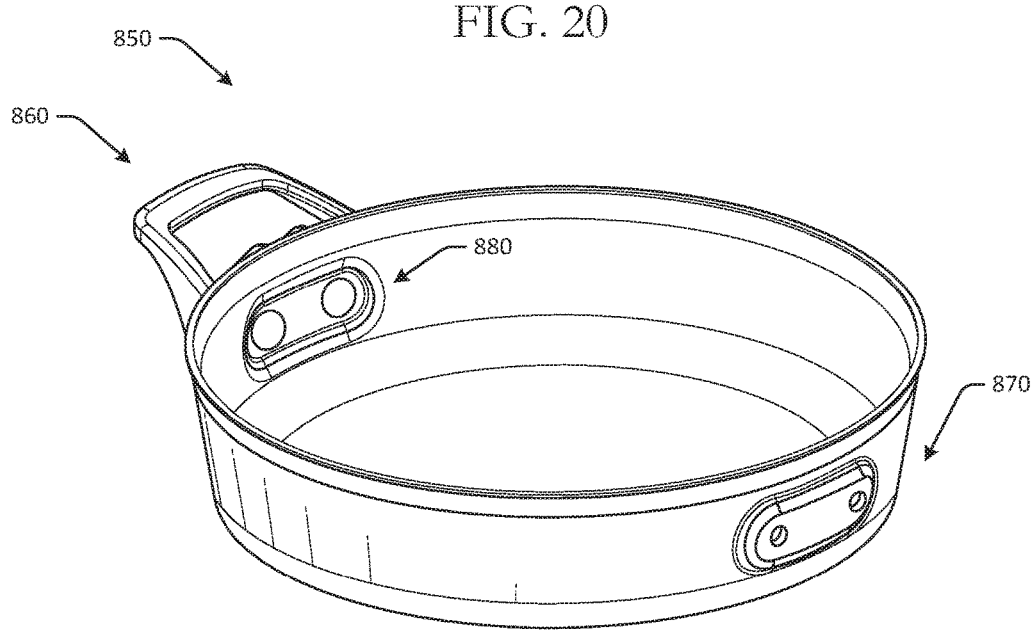

FIG. 21 illustrates an example vessel 850 with a loop handle 860 and an opposing rest portion 870. The vessel 850 may be stackable with any of the other vessels and lids described herein. Some embodiments may include an embossed area 880 of the vessel 850 where the handles are attached, so as to allow any rivet heads on an inside of the vessel to side flush to the interior surface. The embossed area may be used to create a reduced or lesser draft angle on the vessel 850 and may prevent the exterior of the vessel 850 from touching rivet heads on lower vessels and/or scratching the upper vessel exterior. The embossed area 880 can include some or all rivet heads, or individual embosses for each rivet head. Other embodiments may reduce draft angles by welding a handle/feature to the vessel exterior or die casting a feature on the exterior of the vessel.

Figure 22:
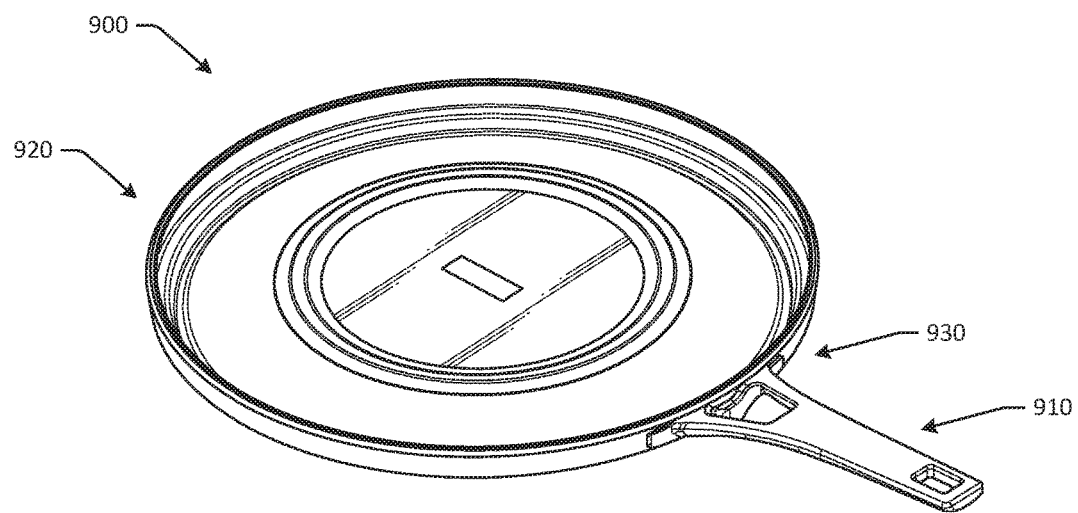
FIGS. 22-25 schematically depict additional embodiments of stackable cookware lids in accordance with one or more embodiments of the disclosure.
Figure 23:
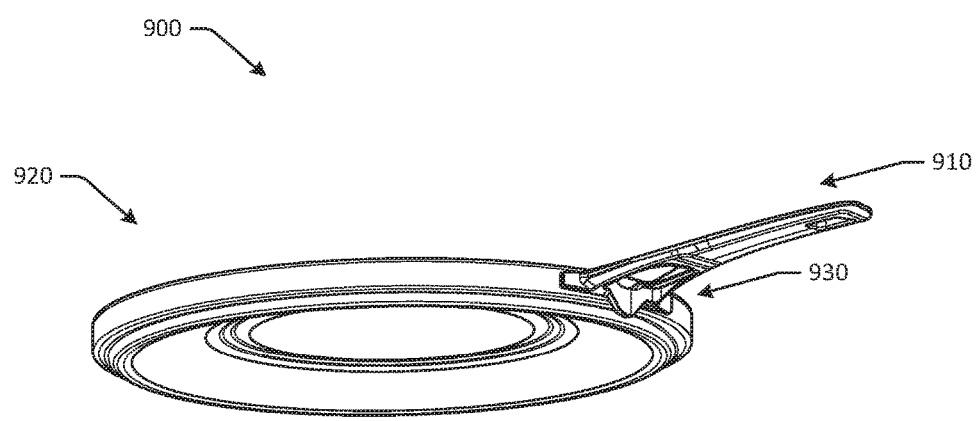

FIGS. 22-23 illustrate an example lid 900 with a long handle 910. The long handle 910 may be coupled to a cover portion 920 of the lid with one or more rivets, screws, or welding 930. The rivets, screws, or welding 930 may be positioned along a rim of the lid 900. In some embodiments, the long handle 910 may be welded to the cover portion. The lid 900 may be formed at least partially of stainless steel, such that the lid 900 can be stacked on or under lids or vessels. In some embodiments, long handles and loop handles may be welded to exterior sides on the rims of the lids. Other embodiments may be formed at least partially of glass.

Figure 24:
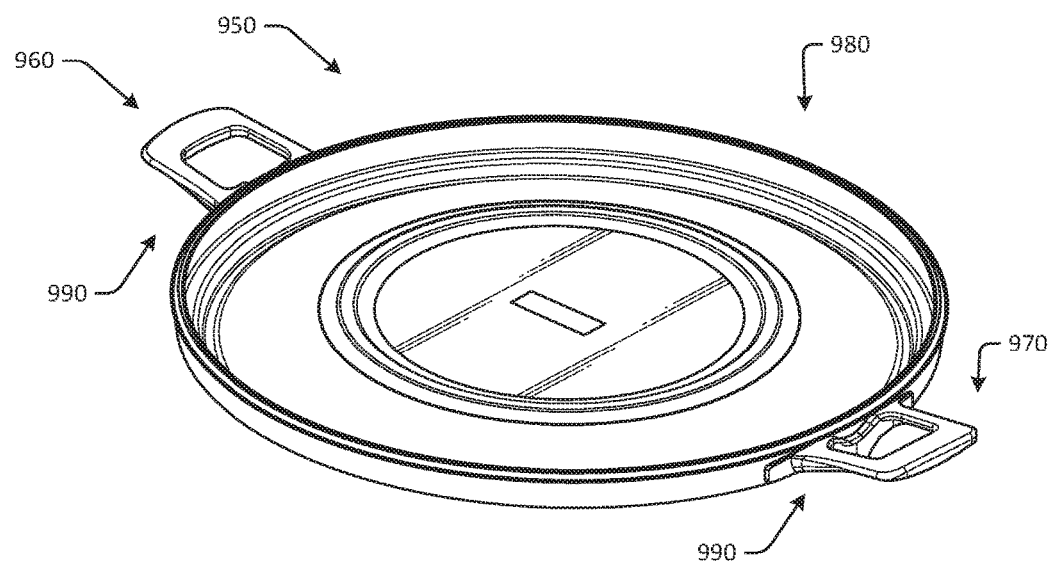
Figure 25:
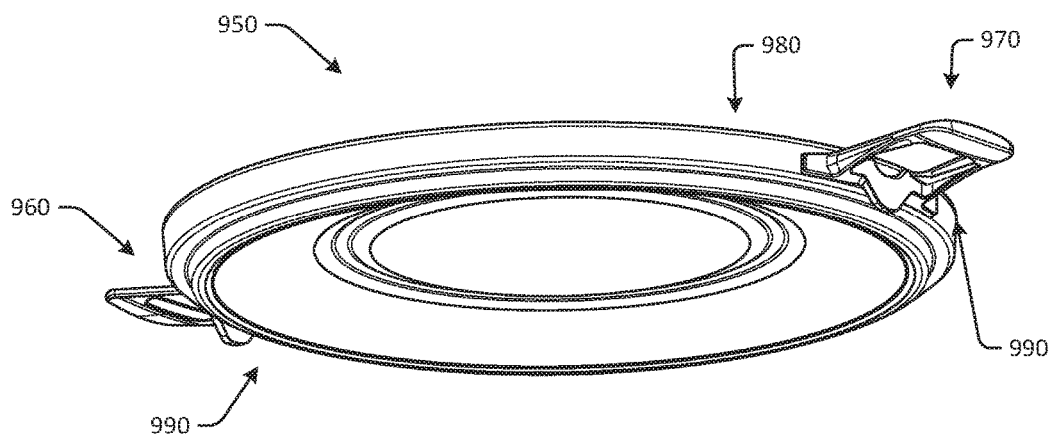

FIGS. 24-25 illustrate an example lid 950 with a first loop handle 960 and a second loop handle 970 that is positioned opposite the first loop handle 960. The first loop handle 960 and the second loop handle 970 may be coupled to a cover portion 980 of the lid with one or more rivets, screws, or welding 990. The rivets, screws, or welding 990 may be positioned along a rim of the lid 900. In some embodiments, the first loop handle 960 and the second loop handle 970 may be welded to the cover portion. The lid 950 may be formed at least partially of stainless steel, such that the lid 950 can be stacked on or under lids or vessels. In some embodiments, long handles and loop handles may be welded to exterior sides on the rims of the lids. Other embodiments may be formed at least partially of glass. As shown in FIG. 25, the loop handles 960, 970 may optionally include alignment features as described above.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A cookware system comprising:
    a first cookware vessel comprising:
        a first upper portion with an upper diameter, the first upper portion comprising a first rim with a first upper surface and a first lower surface;
        a first lower portion with a lower diameter that is less than the upper diameter;
        a first sidewall extending from the first upper portion to the first lower portion, wherein the first sidewall tapers from the upper diameter to the lower diameter; and
        a first handle extending from the first sidewall of the first vessel; and
    a second cookware vessel comprising:
        a second upper portion with the upper diameter, the second upper portion comprising a second rim with a second upper surface and a second lower surface;
        a second lower portion;
        a second sidewall extending from the second upper portion to the second lower portion; and
        a second handle extending from the second sidewall of the second vessel;
    wherein the first cookware vessel is positioned adjacent to the second cookware vessel with the first lower portion positioned within the second cookware vessel, wherein the first lower surface is positioned parallel to and at least partially in contact with the second upper surface and the first handle is aligned with and disposed above the second handle.

2. The cookware system of claim 1, further comprising:
    a third cookware vessel comprising a third upper portion with the upper diameter, the third upper portion comprising a third upper surface;
    wherein the second lower portion of the second cookware vessel is positioned within the third cookware vessel, such that the second lower surface is positioned parallel to and at least partially in contact with the third upper surface.

3. A stackable cookware system comprising:
   a first vessel comprising:
   a first upper portion having a first upper diameter;
   a first lower portion having a first lower diameter that is less than the upper diameter;
   a first sidewall tapering inward from the first upper portion to the first lower portion; and
   a first handle extending from a sidewall of the first vessel, wherein the first handle comprises a first length, a first female alignment feature, and a first male alignment feature;
   a first lid comprising:
   the first upper diameter;
   a second handle comprising a second length, a second female alignment feature, and a second male alignment feature; and
   a first inner rim extending from a surface of the first lid, the first inner rim having a first inner rim diameter that is less than the first upper diameter, wherein the first inner rim is configured to be positioned inside the first vessel; and
   a second vessel comprising a second upper portion having the first upper diameter, a third handle, and a first gripping portion, wherein the first gripping portion has a lower surface aligned with a lower portion of the third handle;
   wherein the first vessel, the first lid, and the second vessel are stackable in a stack with an interchangeable arrangement.

4. The stackable cookware system of claim 3, wherein the sidewall is tapered at an angle of 6 degrees between the first upper portion and the first lower portion.

5. The stackable cookware system of claim 3, wherein the second length of the second handle is less than the first length of the first handle.

6. The stackable cookware system of claim 3, wherein in the stack, the first male alignment feature contacts the second female alignment feature.

7. The stackable cookware system of claim 3, wherein the first lid comprises a flat or domed configuration.

8. The stackable cookware system of claim 3, wherein the first lid comprises metal, composite material, or glass.

9. The stackable cookware system of claim 3, wherein the first lid forms a bottom of the stack.

10. The stackable cookware system of claim 3, wherein the first vessel forms a bottom of the stack.

11. The stackable cookware system of claim 3, wherein the second vessel forms a bottom of the stack.

12. The stackable cookware system of claim 3, wherein the first lid is positioned in between the first vessel and the second vessel in the stack.

13. The stackable cookware system of claim 12, wherein the first inner rim comprises one or more apertures configured to align with a pour spout, the first inner rim having a second height that is equal to or greater than a first height of the pour spout.

14. The stackable cookware system of claim 3, wherein the second handle is rotatable with respect to the surface of the first lid.

15. The stackable cookware system of claim 3, wherein the first upper diameter is an inner diameter of an upper portion of the first vessel.

16. The stackable cookware system of claim 3, wherein the second vessel is positioned on an upper portion of the first vessel, such that the lower portion of the first gripping portion and the lower portion of the third handle are in contact with the upper portion of the first vessel.

17. A cookware system comprising:
   a pot with a first upper diameter;
   a frying pan with a second upper diameter positioned on an upper portion of the pot, the frying pan comprising a first handle and a gripping portion configured to engage an upper surface of the pot, wherein a sidewall of the frying pan is tapered such that a portion of the frying pan fits inside the pot; and
   a lid with a third upper diameter positioned on an upper portion of the frying pan, the lid comprising a second handle positioned on an upper portion of the first handle and an inner rim positioned inside the frying pan, wherein the first upper diameter, the second upper diameter, and the third upper diameter are equal.

18. The cookware system of claim 17, wherein the pot, the frying pan, and the lid are stackable in an interchangeable arrangement.

19. The cookware system of claim 17, wherein the frying pan comprises an embossed area with one or more rivet heads.

20. The cookware system of claim 17, wherein the pot, the frying pan, and the lid are rotatable with respect to each other.

* * * * *